UNITED STATES PATENT OFFICE.

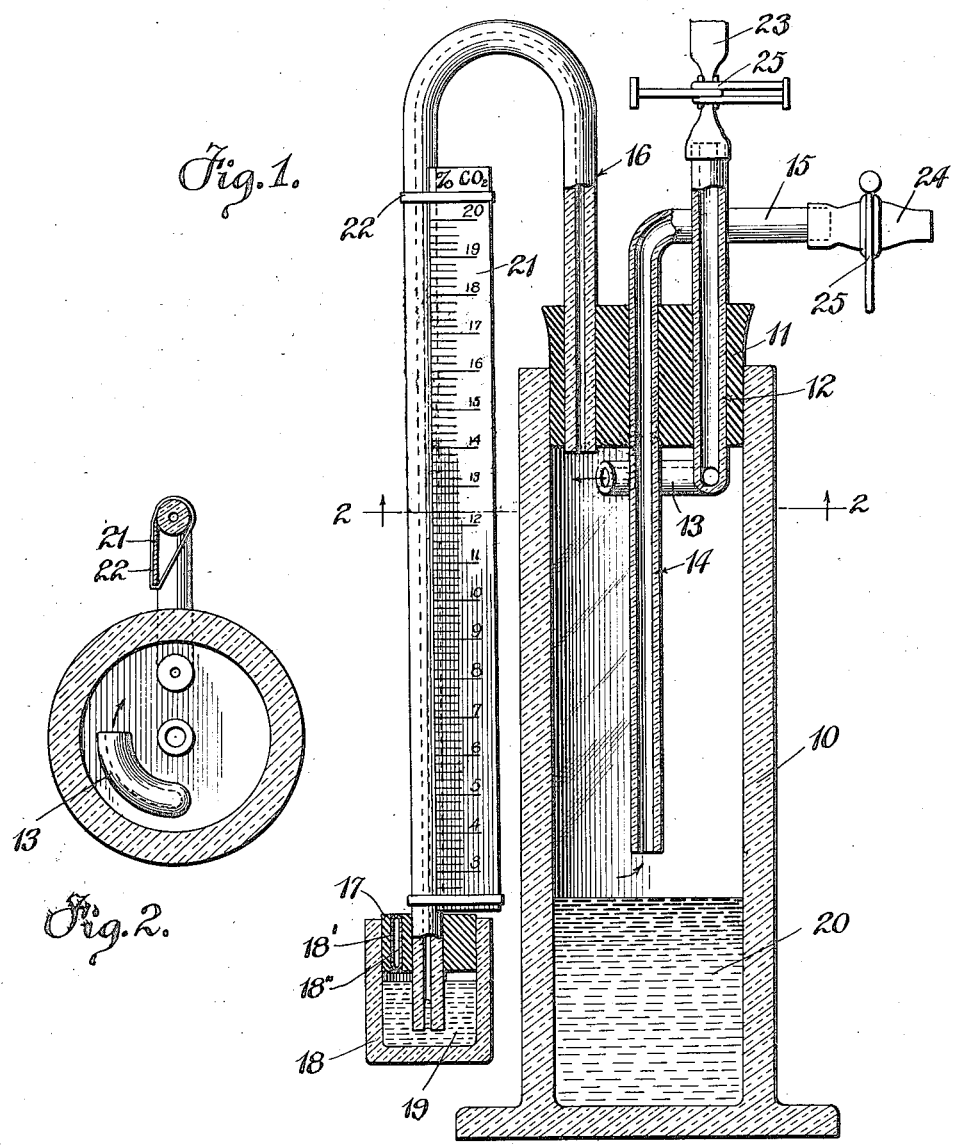

ARVID FRISAK, OF WOODBURY, NEW JERSEY.

CARBONIC-ACID INDICATOR.

1,223,953.      Specification of Letters Patent.      Patented Apr. 24, 1917.

Application filed January 6, 1917. Serial No. 141,000.

*To all whom it may concern:*

Be it known that I, ARVID FRISAK, a subject of the King of Norway, residing at Woodbury, in the county of Gloucester and State of New Jersey, have invented certain new and useful Improvements in Carbonic-Acid Indicators, of which the following is a specification.

My invention relates to new and useful improvements in carbonic acid indicators, the primary object of my invention being the provision of an apparatus by means of which the percentage of carbonic acid or carbon dioxid in a gas may be quickly determined.

More particularly, my present invention is intended for use in testing flue gases of furnaces for carbonic acid in order that the operator may readily determine whether the fire is burning properly or not.

One of the primary objects of my invention consists in constructing an apparatus for the above described purpose in which the carbonic acid, contained in the gas to be tested, is absorbed while the gas is in a closed vessel, with the result that a partial vacuum is formed, the extent of which will indicate the percentage of carbonic acid present.

In this connection, a further object of my invention consists in providing means coöperating with the absorption chamber and including a mercury column and scale by means of which the percentage of vacuum and consequent percentage of carbonic acid may be readily determined.

Another object of my invention consists in providing a novel means for supplying the gas to be tested to the absorption chamber in such a manner as to insure as complete removal of previously tested gas or air from such chamber as possible prior to the test.

Another object which I have in view is the construction of an apparatus of the above described character in which the means for absorbing the carbonic acid and the absorption chamber or space in which the gas to be tested is passed constitute and form part of a single chamber.

Another object of this invention resides in so arranging the apparatus that the gas to be tested need not be passed through the absorbent employed.

With these and other objects in view my invention will be more fully described, illustrated in the accompanying drawings, and then specifically pointed out in the claims which are attached to and form a part of this application.

In the drawings:

Figure 1 is a central vertical sectional view taken through my improved apparatus;

Fig. 2 is a transverse sectional view taken on the line 2—2 of Fig. 1, looking in the direction of the arrows.

Corresponding and like parts are referred to in the following description and indicated in all the views of the drawings by the same reference characters.

My improved apparatus may be constructed in various sizes, but is preferably made of relatively small size in order that, if necessary, it may be carried in the pocket of a man carrying out the tests. The apparatus includes a glass cylinder 10, the open end of which is closed by a stopper 11 preferably formed of rubber. This stopper is formed with an opening to receive a glass tube 12, the inner end of which is bent into an arc, as shown at 13, in Fig. 2, the tube being so bent that this arc will lie in a horizontal plane when the cylinder is in a vertical position. The stopper is further provided, and preferably at a central point, with an opening to receive a tube 14, the outer end of which is preferably directed at right angles, as shown at 15, to facilitate operation, as will be later apparent. A further opening formed in the stopper is adapted to receive the shorter arm of a U-tube 16 having a relatively small bore or passage. The outer or longer arm of this tube extends parallel with the cylinder to a point near the bottom of the cylinder and is there passed through an opening in a stopper 17 which serves as a closure for a relatively small vessel or cup 18. This stopper 17 is formed with an air passage 18′ and the vessel incloses a quantity of mercury 19. The air passage 18′ should be very small or a glass tube 18″ having its ends nearly drawn together to form extremely restricted passages should be fitted in the passage 18′ in order to prevent escape of mercury from the container 18. The shorter arm of the U-tube 16 extends but a slight distance through the stopper 11 and the arcuate terminal of the tube 12 is disposed slightly below the bottom or inner end of the stopper. The cylinder 10 contains a quantity of some carbonic acid absorbing solution 20 and the lower end of the tube 14 extends to within a short distance of the surface of this solution. Preferably, although solely because of its cheapness, the solution is an aqueous solution of caustic soda in the proportions of one part of caustic soda to three or four parts of water, although a caustic potash solution may be employed with equally as good results.

A scale 21 is secured to the longer outer arm of the U-tube 16 by brackets or clamps 22 in such a manner as to engage against the tube and extend parallel thereto with its lower end preferably engaging against the stopper 17. This scale is inscribed with suitable scale divisions by means of which the height of a mercury column in the longer arm of the tube may be readily read and, as will be later pointed out, these scale divisions indicate the percentage of carbonic acid in the gas being tested. The outer ends of the glass tubes 12 and 15 receive lengths of rubber tubing 23 and 24 and each of these is provided with a pinch cock 25 of any suitable type.

Before explaining the operation of the above described apparatus, I wish to first point out the broad principle upon which it operates. When carbon is burnt in air, the carbon combines with a portion of the oxygen in the air to form carbon dioxid or carbonic acid, the volume of the carbon dioxid thus formed being the same as the oxygen consumed. As the oxygen in the air is always 20.8% by volume of the total quantity of air, the sum of the oxygen in the air and of the carbon dioxid therein, after burning of carbon in the air, is, of course, 20.8 of the total volume. This fact gives a simple means for calculating the excess air used in burning carbon.

Coal consists in the main part of carbon, although its content of free hydrogen will consume oxygen without giving an equivalent of carbon dioxid. The sum of the carbon dioxid and oxygen in the air or gas remaining after the burning is, however, changed only a little and will be found to be in the flue gases for most coals about 19%, although for certain grades of coal the per cent. of combined carbon dioxid and oxygen may be a little higher or a little lower.

It is, of course, a well known fact that furnaces and boilers differ in respect to the excess amount of air needed to produce a most perfect and efficient combustion of the fuel employed and it will, therefore, be clear that, assuming the fireman or boilerman has once found out what percentage of carbon dioxid or carbonic acid there will be in the flue gases of his furnace, when the furnace fire is burning in the most efficient manner, it will be a simple matter for him to maintain the fire in such a condition if he can make frequent tests of the flue gases as any changes in the percentage of carbonic acid in such gases will indicate that the coal bed is too thin or too thick, the draft too heavy or too light, or the grates clogged and he can, by overcoming whichever one of these defects is present, bring the fire back to proper condition.

If, for an example, the boiler flue gas should have 10% of carbonic acid, it would show that the fire was using 10/19 of the total oxygen of the air supplied or that the total air supplied was 19/10 of the quantity theoretically necessary and that the excess is, consequently, 9/10 or 90%. This test would immediately show that the coal bed was too thin or the draft too heavy.

In employing my apparatus, both pinch cocks 25 are opened and gas is passed into the cylinder through the pipe 12 and out through the pipe 14 for a short time when the pinch cock of the tube 13, which is the inlet tube, is closed. After a brief lapse of time, merely sufficient to permit the gases in the cylinder 10 to reach atmospheric pressure, the pinch cock of the tube 24 is also closed. The apparatus is then gently shaken for about two minutes, after which all of the carbon dioxid or carbonic acid contained in the flue gases inclosed in the cylinder will have been absorbed by the caustic soda solution. The absorption of this carbon dioxid by the solution will not increase the volume of the solution and, as a result, a partial vacuum, depending upon the amount of carbon dioxid originally contained in the flue gases, will be created in the cylinder. This creation of a partial vacuum in the cylinder will cause a mercury column to rise in the longer end of the U-tube 16 and the height of this column may be readily read from the scale 21 which is so calibrated that its divisions indicate the percentage of carbon dioxid absorbed from the flue gases.

The spiral motion imparted to the flue gases, as they enter through the pipe 12, prevents the formation of by-currents in the cylinder and causes a relatively clean sweeping out of all air in the cylinder or of all old gases remaining therein after a previous test. This is particularly true, due to the fact that the lower end of the outlet pipe is spaced but a slight distance above the level of the absorbing solution. This also causes the escape of those gases which first come in contact with the absorbing solution so that at the time of the actual test practically none of the gases to be tested have come in contact with the solution. With a cylinder of preferred size about one-half liter of gases is sufficient to purge the apparatus. The speed of the gas admitted can be widely varied, the rate of gas admission being about one liter per minute.

Normal atmospheric pressure being equivalent to thirty inches of mercury, a 1% vacuum is equal to .3 inches of mercury. Numerous tests in laboratory and mills, with the above described apparatus, gave very uniform results, the average vacuum being 95% of the carbon dioxid or carbonic acid gas content of the flue gases as found with a U. S. Steel Corporation standard orsat. This 5% discrepancy is accounted for by the volume of gas remaining in the glass tubes without getting into contact with the caustic soda solution. The scale employed is, therefore, graduated so that each .285 inches, being 95% of .3 inches equals 1% of carbonic acid or carbon dioxid.

For accuracy, the gases being tested have to be at the same temperature as the caustic solution employed which may be achieved by leaving the apparatus in the room where the gas is to be tested as the sampling pipe through which the gas will be supplied to the apparatus and the rubber tubing will cool the gas to the temperature of the surrounding atmosphere, even though the gases being sampled are relatively hot. In fact it has been found that the insertion of a copper coil in the gas supply pipe to cause cooling of the gas before it enters the testing apparatus is superfluous, even when testing flue gases having a temperature of 1100 degrees Fahrenheit. It should be noted that the thickness of the walls of the glass cylinder is such that there will be no appreciable change in temperature of the caustic solution, due to handling of the cylinder while agitating its contents.

The caustic soda solution is preferable to caustic potash as being cheaper and may be employed weak enough to prevent precipitates of carbonates. The cylinder, when filled in the manner shown in Fig. 1, will hold sufficient solution for over one hundred tests or determinations and as the walls of the cylinder are vertical, the solution will readily drain to the bottom, after agitation, so that whatever slight coating of solution is left on the walls will be neutralized by the carbon dioxid entering with the first flue gases, which gases are passed from the cylinder before the final test is made.

Any suitable means may be employed for supplying the gases to the cylinder in the quantities and at the speeds desired. For instance, the gases can be pushed through the cylinder with a rubber pump (bulb with check valves) or samples can be drawn with two communicating bottles, the one bottle lowered when the gas is to be drawn from the flue and raised when the gas is to be pushed through the apparatus. The sources of error, due to variations of temperature and moisture, for the above described apparatus are the same as in other devices. The apparatus is extremely simple, both in construction and its method of employment and it may be economically maintained as the caustic soda solution need not be often renewed.

Having thus described the invention, what is claimed as new is:

1. An apparatus for determining the percentage of carbonic acid in flue gases including a cylinder, a stopper closing one end of the cylinder, gas inlet and outlet tubes projecting through the stopper, a caustic soda solution in the cylinder, the outlet tube terminating at one end slightly above the level of the solution and the inlet tube terminating at one end adjacent the upper end of the cylinder, means for independently cutting off passage of gas through the tubes, and means for determining the amount of any vacuum created in the cylinder.

2. An apparatus for determining the percentage of carbonic acid in flue gases including a cylinder, a stopper closing one end of the cylinder, gas inlet and outlet tubes projecting through the stopper, a caustic soda solution in the cylinder, the outlet tube terminating at one end slightly above the level of the solution and the inlet tube terminating at one end adjacent the upper end of the cylinder, means for independently cutting off passage of gas through the tubes, a U-tube having one end projecting through the stopper of the cylinder, a mercury holding container into which the opposite end of the tube projects, and a scale supported in juxtaposition to that arm of the U-tube extending into the mercury whereby the height of a mercury column in such arm may be read.

3. An apparatus for determining the percentage of carbonic acid in flue gases including a cylinder, a stopper closing one end of the cylinder, a tube extending through the stopper with its inner end bent to provide an arcuate terminal lying in a plane at right angles to the axis of the cylinder and adjacent the stopper, an outlet tube projecting through the stopper with its inner end spaced from the bottom of the cylinder, a caustic soda solution in the cylinder, the level of which is slightly below the inner end of the outlet tube, cocks independently controlling passage of gas through the tubes, and means for determining the percentage of any vacuum created in the cylinder.

4. An apparatus for determining the percentage of carbonic acid in flue gases including a cylinder, a stopper closing one end of the cylinder, a tube extending through the stopper with its inner end bent to provide an arcuate terminal lying in a plane at right angles to the axis of the cylinder and adjacent the stopper, an outlet tube projecting through the stopper with its inner end spaced from the bottom of the cylinder, a caustic soda solution in the cylinder, the level of which is slightly below the inner end of the outlet tube, cocks independently controlling passage of gas through the tubes, and means for determining the percentage of any vacuum created in the cylinder, said means including a mercury holding container closed by a stopper having an air vent, a U-tube having one end projecting through the stopper of the cylinder and the other through the stopper of the container and into the mercury, and a scale carried by that arm of the U-tube projecting into the mercury whereby the height of a mercury column in such arm may be read.

5. An apparatus for determining the percentage of carbonic acid in flue gases including a container, a stopper closing one end of the container, gas inlet and outlet tubes projecting through the stopper, a carbonic acid absorber in the container, the outlet tube terminating at one end in spaced relation to the bottom of the container and the inlet tube having its inner end bent to provide an arcuate terminal disposed slightly below the stopper in substantially a horizontal plane, means for independently cutting off passage of gas through the tubes, and means for determining the amount of any vacuum created in the container.

6. An apparatus for determining the percentage of carbonic acid in flue gases including a container, a stopper closing one end of the container, gas inlet and outlet tubes projecting through the stopper, a carbonic acid absorber in the container, means for independently cutting off passage of gas through the tubes, a mercury container, a stopper closing the mercury container, a U-tube having one end projecting through the stopper of the first container and the other through the stopper of the mercury container, the latter stopper being formed with an air opening, a tube fitting within the opening and having its ends drawn together to provide restricted air passages, and a scale for reading the column of mercury above the mercury container.

In testimony whereof I affix my signature.

ARVID FRISAK. [L. S.]